(12) United States Patent
Birk et al.

(10) Patent No.: US 7,110,645 B2
(45) Date of Patent: Sep. 19, 2006

(54) METHOD AND INSTRUMENT FOR MICROSCOPY

(75) Inventors: Holger Birk, Meckesheim (DE); Rafael Storz, Bammental (DE); Johann Engelhardt, Bad Schoenborn (DE); Kyra Moellmann, Trippstadt (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 10/964,034

(22) Filed: Oct. 13, 2004

(65) Prior Publication Data

US 2005/0111816 A1    May 26, 2005

Related U.S. Application Data

(63) Continuation of application No. 09/881,049, filed on Jun. 15, 2001, now Pat. No. 6,898,367.

(30) Foreign Application Priority Data

| Jun. 17, 2000 | (DE) | ................. 100 30 013 |
| Mar. 29, 2001 | (DE) | ................. 101 15 486 |
| Mar. 29, 2001 | (DE) | ................. 101 15 487 |
| Mar. 29, 2001 | (DE) | ................. 101 15 488 |
| Mar. 29, 2001 | (DE) | ................. 101 15 509 |
| Mar. 29, 2001 | (DE) | ................. 101 15 577 |
| Mar. 29, 2001 | (DE) | ................. 101 15 589 |
| Mar. 29, 2001 | (DE) | ................. 101 15 590 |

(51) Int. Cl.
*G02B 6/06* (2006.01)
*G02B 21/00* (2006.01)

(52) U.S. Cl. .............. 385/117; 385/116; 385/36; 385/88; 385/89; 385/92; 385/901; 359/368

(58) Field of Classification Search ............... 385/31, 385/88, 89, 92, 94, 147, 901, 36, 115, 116, 385/117; 359/368, 385, 388
See application file for complete search history.

(56) References Cited

U.S. PATENT DOCUMENTS

| 4,063,106 A |   | 12/1977 | Ashkin et al. ............ 359/327 |
| 4,561,731 A | * | 12/1985 | Kley ............................ 349/1 |
| 4,806,776 A | * | 2/1989  | Kley ..................... 250/559.24 |
| 5,034,613 A |   | 7/1991  | Denk et al. ............. 250/458.1 |
| 5,161,053 A |   | 11/1992 | Dabbs ...................... 359/384 |

(Continued)

FOREIGN PATENT DOCUMENTS

| DE | 44 14 940 | 11/1995 | ............. 250/458.1 |

(Continued)

OTHER PUBLICATIONS

J.K. Ranka et al.: "Visible Continuum Generation in Air-silica Microstructure Optical Fibers with Anomalous Dispersion at 800nm", Optics Letters, Optical Society of America, Washington, vol. 25, No. 1, Jan. 1, 2000, XP000928530, ISSN: 0146-9592, pp. 25-27.

(Continued)

*Primary Examiner*—Brian M. Healy
(74) *Attorney, Agent, or Firm*—Darby & Darby

(57) ABSTRACT

A microscope includes a light source that emits an illuminating light beam for illumination of a specimen, a beam splitter separating measuring light out of the illuminating light beam, and an apparatus for determining the light power level of the illuminating light beam. The apparatus for determining the light power level of the illuminating light beam receives the measuring light and includes an apparatus for simultaneous color-selective detection of the measuring light.

19 Claims, 5 Drawing Sheets

U.S. PATENT DOCUMENTS

| | | | |
|---|---|---|---|
| 5,350,921 A | 9/1994 | Aoyama et al. | 250/311 |
| 5,537,247 A | 7/1996 | Xiao | 359/368 |
| 5,777,732 A | 7/1998 | Hanninen et al. | 356/318 |
| 5,786,890 A | 7/1998 | Noh | 356/225 |
| 5,796,477 A | 8/1998 | Teich et al. | 356/318 |
| 5,799,126 A | 8/1998 | Nagatani et al. | 385/146 |
| 5,802,236 A | 9/1998 | DiGiovanni et al. | 385/127 |
| 5,861,984 A | 1/1999 | Schoppe | 359/385 |
| 5,862,287 A | 1/1999 | Stock et al. | 385/123 |
| 5,903,688 A | 5/1999 | Engelhardt et al. | 385/31 |
| 5,967,653 A | 10/1999 | Miller et al. | 362/580 |
| 5,995,281 A | 11/1999 | Simon et al. | 359/368 |
| 6,002,522 A | 12/1999 | Todori et al. | 359/573 |
| 6,052,238 A | 4/2000 | Ebbesen et al. | 359/738 |
| 6,055,097 A | 4/2000 | Lanni et al. | 359/386 |
| 6,108,127 A | 8/2000 | Atkinson | 359/389 |
| 6,178,041 B1 | 1/2001 | Simon | 359/368 |
| 6,236,779 B1 | 5/2001 | Kafka et al. | 385/31 |
| 6,252,665 B1 | 6/2001 | Williams et al. | 356/450 |
| 6,356,088 B1 | 3/2002 | Simon et al. | 324/752 |
| 6,369,928 B1 | 4/2002 | Mandella et al. | 359/204 |
| 6,396,053 B1 | 5/2002 | Yokoi | 250/234 |
| 6,424,665 B1 | 7/2002 | Kwiat et al. | 372/21 |
| 6,514,784 B1 | 2/2003 | Dubowski | 438/35 |
| 6,631,234 B1 | 10/2003 | Russell et al. | 385/125 |
| 6,836,359 B1 * | 12/2004 | Knebel | 359/388 |
| 2002/0031783 A1 * | 3/2002 | Empedocles et al. | 435/7.1 |
| 2002/0090650 A1 * | 7/2002 | Empedocles et al. | 435/7.1 |
| 2003/0184857 A1 * | 10/2003 | Hay | 359/385 |

FOREIGN PATENT DOCUMENTS

| | | | |
|---|---|---|---|
| DE | 196 22 359 | 12/1997 | 359/368 |
| DE | 197 02 753 | 7/1998 | 359/368 |
| DE | 199 06 757 | 12/1999 | 359/368 |
| DE | 198 29 954 | 1/2000 | 250/458.1 |
| WO | WO 00/16141 | 3/2000 | 250/458.1 |
| WO | WO 00/49435 | 8/2000 | 250/458.1 |

OTHER PUBLICATIONS

J.C. Knight et al.: "Anomalous Dispersion in Photonic Crystal Fiber", IEEE Photonics Technology Letters, IEEE Inc., New York, vol. 12, No. 7, Jul. 2000, XP000968675, ISSN: 1041-1135, pp. 807-809.

D. Petrosyan et al.: "Photon-photon Correlations and Entanglement in Doped Photonic Crystals", Physical Review A (Atomic Molecular, and Optical Physics), Aug. 2001, APS Through AIP, vol. 64, No. 2, XP002177163, ISSN: 1050-2947, pp. 023810/1-6.

European Search Report for EP 1 164 403 A1, Sep. 26, 2001 (2 pages): and brief translation thereof (2 pages).

* cited by examiner

METHOD AND INSTRUMENT FOR MICROSCOPY

CROSS REFERENCE TO RELATED APPLICATIONS

This invention is a continuation of U.S. patent application Ser. No. 09/881,049, filed Jun. 15, 2001, now U.S. Pat. No. 6,898,367, which claims priority to German patent applications 100 30 013.8 and 101 15 487.9 and 101 15 589.1 and 101 15 486.0 and 101 15 488.7 and 101 15 509.3 and 101 15 577.8 and 101 15 590.5, all of which are hereby incorporated by reference herein.

This application refers to U.S. patent application Ser. No. 09/881,048, now abandoned, entitled "ARRANGEMENT FOR STUDYING MICROSCOPIC PREPARATIONS WITH A SCANNING MICROSCOPE", which is incorporated herewith.

This application refers to U.S. patent application Ser. No. 09/881,046, now U.S. Pat. No. 6,611,643, entitled "ILLUMINATING DEVICE AND MICROSCOPE", which is hereby incorporated by reference herein.

This application refers to U.S. patent application Ser. No. 09/880,825, now U.S. Pat. No. 6,567,164, entitled "ENTANGLED-PHOTON MICROSCOPE AND CONFOCAL MICROSCOPE", which is hereby incorporated by reference herein.

This application refers to U.S. patent application Ser. No. 09/881,062, now U.S. Pat. No. 6,888,674, entitled "ARRANGEMENT FOR EXAMINING MICROSCOPIC PREPARATIONS WITH A SCANNING MICROSCOPE, AND ILLUMINATION DEVICE FOR A SCANNING MICROSCOPE", which is hereby incorporated by reference herein.

This application refers to U.S. patent application Ser. No. 09/881,212, now U.S. Pat. No. 6,888,674, entitled "METHOD AND INSTRUMENT FOR ILLUMINATING AN OBJECT", which is hereby incorporated by reference herein.

This application refers to U.S. patent application Ser. No. 09/881,047, now U.S. Pat. No. 6,654,166, entitled "SCANNING MICROSCOPE WITH MULTIBAND ILLUMINATION AND OPTICAL COMPONENT FOR A SCANNING MICROSCOPE WITH MULTIBAND ILLUMINATION", which is hereby incorporated by reference herein.

This application refers to U.S. patent application Ser. No. 09/882,355, now U.S. Pat. No. 6,710,918, entitled "SCANNING MICROSCOPE", which is hereby incorporated by reference herein.

FIELD OF THE INVENTION

The invention relates to a method for illuminating an object. The invention also relates to an instrument for illuminating an object.

BACKGROUND OF THE INVENTION

Laid-open patent specification DE 198 53 669 A1 discloses an ultrashort-pulse source with controllable multiple-wavelength output, which is used especially in a multiphoton microscope. The system has an ultrashort-pulse laser for producing ultrashort optical pulses of a fixed wavelength and at least one wavelength conversion channel.

U.S. Pat. No. 6,097,870 discloses an arrangement for generating a broadband spectrum in the visible and infrared spectral range. The arrangement is based on a microstructured fibre, into which the light from a pump laser is injected. The pump light is broadened in the microstructured fibre by non-linear effects. So-called photonic band gap material or "photonic crystal fibres", "holey fibres" or "microstructured fibres" are also employed as microstructured fibres. Configurations as a so-called "hollow fibre" are also known.

Another arrangement for generating a broadband spectrum is disclosed in the publication by Birks et al.: "Supercontinuum generation in tapered fibres", Opt. Lett. Vol. 25, p. 1415 (2000). A conventional optical fibre having a fibre core, which has a taper at least along a subsection, is used in the arrangement. Optical fibres of this type are known as so-called "tapered fibres".

An optical amplifier, whose gain can be adjusted as a function of the wavelength, is known from the PCT application with the publication number WO 00/04613. The said publication also discloses a fibre light source based on this principle.

Arc lamps are known as broadband light sources, and are employed in many areas. One example is the U.S. Pat. No. 3,720,822 "XENON PHOTOGRAPHY LIGHT", which discloses a xenon arc lamp for illumination in photography.

Especially in microscopy, endoscopy, flow cytometry, chromatography and lithography, universal illuminating devices with high luminance are important for the illumination of objects. In scanning microscopy, a sample is scanned with a light beam. To that end, lasers are often used as the light source. For example, an arrangement having a single laser which emits several laser lines is known from EP 0 495 930: "Konfokales Mikroskopsystem für Mehrfarbenfluoreszenz" [confocal microscope system for multicolour fluorescence]. Mixed gas lasers, especially ArKr lasers, are mainly used for this at present. Examples of samples which are studied include biological tissue or sections prepared with fluorescent dyes. In the field of material study, illumination light reflected from the sample is often detected. Solid-state lasers and dye lasers, as well as fibre lasers and optical parametric oscillators (OPOs), upstream of which a pump laser is arranged, are also frequently used.

Microspot arrays or so-called microplates are used in genetic, medical and biodiagnosis for studying large numbers of specifically labelled spots, which are preferably applied in a grid. A microplate reader which can be adjusted both in excitation wavelength and in detection wavelength is disclosed in the European Patient Application EP 0 841 557 A2.

The illumination methods and illuminating instruments known from the prior art have several disadvantages. The known broadband illuminating instruments mostly have a low luminance compared with laser-based illuminating devices, whereas the latter provide the user only with discrete wavelength lines whose spectral position and width can be adjusted only to a small extent, if at all. Owing to this limitation of the working spectrum, the known illuminating devices are not flexibly usable. Laser-based illuminating devices and illuminating methods also have the disadvantage that, owing to the high coherence of the laser light, disruptive interference phenomena, such as e.g. diffraction rings and Newton's rings, occur. To reduce these interference effects, additional optical elements are often used, which reduce the light power by intrinsic absorption and by scattering.

SUMMARY OF THE INVENTION

It is an object of the invention to provide a method for illuminating an object which is universally usable and flexible, furthermore provides a broad wavelength spectrum together with a high luminance, and also minimizes interference phenomena.

The present invention provides a method for illuminating an object comprising the following steps:
generating a light beam with a laser,
injecting a light beam into a microstructured optical element which spectrally broadens the light of the light beam,
shaping the spectrally broadened light beam to form an illumination light beam, and
directing the illumination light beam onto the object.

It is another object of the present invention to provide an instrument for illuminating an object, which is universally usable and flexible, furthermore provides a broad wavelength spectrum together with a high luminance, and also minimizes interference phenomena.

The present invention provides an Illuminating instrument comprising: a laser that emits a light beam, a microstructured optical element that spectrally broadens the light from the laser and an optical means for shaping the spectrally broadened light into an illumination light beam.

It is another object of the present invention to provide a device for a microscopic inspection of an object, which is universally usable and flexible, furthermore provides a broad wavelength spectrum together with a high luminance, and also minimizes interference phenomena.

The present invention provides a device comprising: a laser that emits a light beam, a microstructured optical element that spectrally broadens the light from the laser and an optical means for shaping the spectrally broadened light into an illumination light beam.

The invention has the advantage that it is universally usable, easy to handle and flexible, and furthermore provides illumination with light from a wide wavelength range. The light also has very low coherence, so that disruptive interference phenomena are avoided.

By using microstructured fibres, as described in the previously mentioned U.S. Pat. No. 6,097,870 or in the publication by Birks et al., a broad continuous wavelength spectrum is accessible. Arrangements of the disclosed type, however, are difficult to handle, inflexible and susceptible to interference, especially because of the complexity of the individual optical components and their relative adjustment.

A configuration variant in which a lens, which shapes the spectrally broadened light into a beam, is arranged downstream of the microstructured optical element, is especially advantageous. This lens is preferably located inside a casing which houses the entire instrument, immediately in front of or in a light exit opening. The lens is preferably a variable lens with which various divergent, collimated or convergent beam shapes can be produced.

All common laser types may be used as the laser. In a configuration, the laser is a short-pulse laser, for example a mode-locked solid-state laser, which emits light pulses with a pulse width of from 100 fs to 10 ps. The wavelength of the laser is preferably matched to the "zero dispersion wavelength" of the fibre, or vice versa. Apparently, the zero dispersion wavelength can be "shifted" over a certain wavelength range, and this needs to be taken into account when pulling the fibre.

An embodiment of the illuminating device contains an instrument for varying the power of the spectrally broadened light. In this case, it is advantageous to configure the illuminating device in such a way that the power of the spectrally broadened light can be varied or can be fully stopped-out with respect to at least one selectable wavelength or at least one selectable wavelength range.

An instrument for varying the power of the spectrally broadened light is preferably provided. Examples are acousto-optical or electro-optical elements, such as acousto-optical tunable filters (AOTFs). It is likewise possible to use dielectric filters or colour filters, which are preferably arranged in cascade. Particular flexibility is achieved if the filters are fitted in revolvers or in slide mounts, which allow easy insertion into the beam path of the spectrally broadened light.

A configuration which makes it possible to select at least one wavelength range from the spectrally broadened light, the light of the selected wavelength range being directed onto the object, is advantageous. This can be done, for example, using an instrument which spectrally resolves the spectrally broadened light in a spatial fashion, in order to make it possible to suppress or fully stop-out spectral components with a suitable variable aperture arrangement or filter arrangement, and subsequently recombine the remaining spectral components to form a beam. A prism or a grating, for example, may be used for the spatial spectral resolution.

In a special configuration, the method according to the invention comprises the further step of adjusting the power of the spectrally broadened light. To vary the power of the spectrally broadened light, in another alternative embodiment, a Fabry-Perot filter is provided. LCD filters can also be used.

In a configuration variant, the illuminating method comprises the additional step of adjusting the spectral composition of the spectrally broadened light.

An embodiment which directly has an operating element for adjusting the light power and the spectral composition of the spectrally broadened light, is especially advantageous. This may be a control panel or a PC. The adjustment data is preferably transmitted in the form of electrical signals to the illuminating instrument, or to the instrument for varying the power of the spectrally broadened light. Adjustment using sliders, which are displayed on a PC monitor and, for example, can be operated using a computer mouse, is particularly clear.

According to the invention, it has been discovered that the divergence of the light injected into the microstructured optical element has a considerable influence on the spectral distribution of the spectrally broadened light. In a flexible configuration, the illuminating instrument contains a focusing lens which focuses the light beam from the laser onto the microstructured optical element. Embodiment of the focusing lens as a variable lens, for example as a zoom lens, is advantageous.

Since the spectral distribution of the spectrally broadened light depends on the polarization and the wavelength of the light injected into the microstructured optical element, in a particular configuration, instruments are provided for adjusting and influencing these parameters. In the case of lasers, which emit linearly polarized light, a rotatably mounted $\lambda/2$ plate is used to rotate the polarization plane. Somewhat more elaborate, but also more flexible, is the use of a Pockels cell, which also makes it possible to set any desired elliptical polarization, or of a Faraday rotator. To adjust the wavelength, a birefringent plate or a tiltable etalon is preferably provided in the laser.

In a particular configuration, an instrument is provided which permits analysis of the broadened-wavelength light, in particular with regard to the spectral composition and the luminance. The analysis instrument is arranged in such a way that part of the spectrally broadened light is split off, for example with the aid of a beam splitter, and fed to the analysis instrument. The analysis instrument is preferably a spectrometer. It contains, for example, a prism or a grating for the spatial spectral resolution, and a CCD element or a multichannel photomultiplier as the detector. In another variant, the analysis instrument contains a multiband detector. Semiconductor spectrometers can also be employed.

To establish the power of the spectrally broadened light, the detectors are configured in such a way that an electrical signal, which is proportional to the light power and can be evaluated by electronics or a computer, is generated.

The embodiment which contains a display for the power of the spectrally broadened light and/or for the spectral composition of the spectrally broadened light is advantageous. The display is preferably fitted directly on the casing or to the control panel. In another embodiment, the monitor of a PC is used for displaying the power and/or the spectral composition.

In another configuration, the method according to the invention comprises the step of adjusting the polarization of the spectrally broadened light. To that end, a rotatably arranged polarization filter, a $\lambda/2$ plate, a Pockels cell or a Faraday rotator is provided.

In an embodiment, the laser is a pulse laser which preferably emits light pulses with a pulse energy in excess of 1 nJ. In relation to this configuration, the method according to the invention comprises the additional step of adjusting the pulse width of the spectrally broadened light. It is furthermore advantageous that the method allows the further step of adjusting the chirp of the spectrally broadened light. Using these additional steps, the pulse properties of the light directed onto the object can be matched individually to the object in question. "Chirp" means the time sequence of the light are different wavelengths within a pulse. To that end, the instrument according to the invention preferably comprises a prism or a grating arrangement which, in a configuration, is combined with an LCD strip grating. Arrangements for varying the pulse width and the chirp are adequately known to a person skilled in the art.

The illuminating method and instrument can be used, particularly to illuminate a microscopic object, in particular in a microscope, a video microscope, a scanning microscope or confocal scanning microscope. It is advantageous if the wavelength of the light directed onto the object, in the case of fluorescence applications or applications which are based on Forster transfer, is matched accurately to the excitation wavelength of the fluorochromes present in the object.

The illuminating method and instrument can also be used advantageously in endoscopy, flow cytometry and lithography.

In a configuration of the scanning microscope, the microstructured optical element is constructed from a plurality of micro-optical structure elements, which have at least two different optical densities. A configuration in which the optical element contains a first region and a second region, the first region having a homogeneous structure and a microstructure comprising micro-optical structure elements being formed in the second region. It is furthermore advantageous if the first region encloses the second region. The micro-optical structure elements are preferably cannulas, webs, honeycombs, tubes or cavities.

In another configuration, the microstructured optical element consists of adjacent glass or plastic material and cavities. In an alternative embodiment, the microstructured optical element consists of photonic band gap material and is configured as an optical fibre. An optical diode, which suppresses back-reflections of the light beam due to the ends of the optical fibre, is preferably arranged between the laser and the optical fibre.

An alternative embodiment, which is simple to implement, contains a conventional optical fibre having a fibre core diameter of approximately 9 µm, which has a taper at least along a subsection, as the microstructured optical element. Optical fibres of this type are known as so-called "tapered fibres". The optical fibre preferably has an overall length of 1 m and a taper over a length of from 30 mm to 90 mm. The diameter of the optical fibre, in a configuration, is approximately 2 µm in the region of the taper. The fibre core diameter is correspondingly in the nanometer range.

BRIEF DESCRIPTION OF THE DRAWINGS

The subject-matter of the invention is diagrammatically represented in the drawing and will be described below with the aid of the figures, in which.

DETAILED DESCRIPTION OF THE INVENTION

Figure 1:
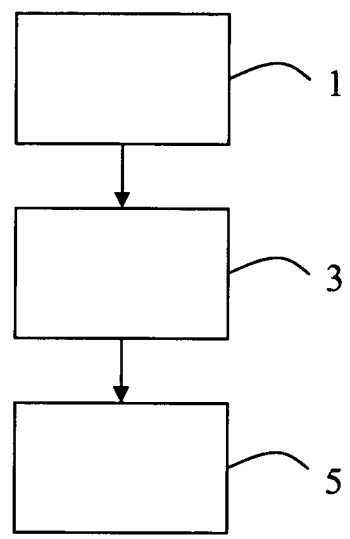
FIG. 1 shows a flow chart of the method according to the invention.

FIG. 1 shows a flow chart of the method according to the invention. In a first step, the light from a laser is injected 1 into a microstructured optical element that spectrally broadens the light. In this case, the light is guided to the microstructured optical element, for example with the aid of mirrors, and is preferably focused onto the microstructured optical element using a variable lens. In a second step, the light emerging from the microstructured optical element is shaped 3 to form an illumination light beam, preferably with the aid of optical means which are configured as lens systems. In a further step, the illumination light beam is directed 5 onto the object.

Figure 2:
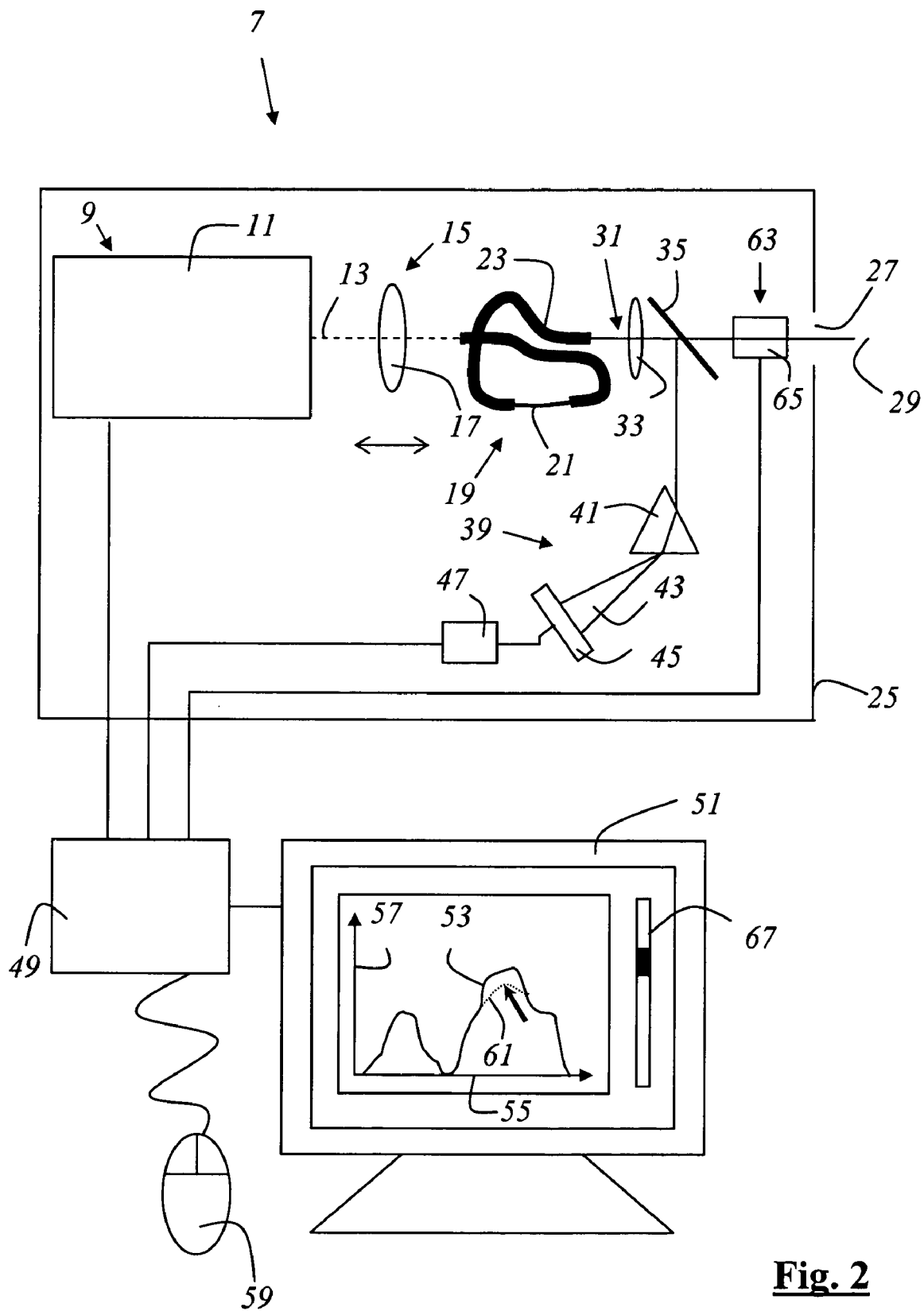
FIG. 2 shows an illuminating device according to the invention with a power meter and a display.

FIG. 2 shows an illuminating instrument 7 which contains a laser 9 that is embodied as a mode-locked Ti:sapphire laser 11 and emits a light beam 13, which is shown in dashes, with the property of an optical pulse train. The width of the light pulses is approximately 100 fs with a repetition rate of approximately 80 MHz. The light beam 13 is focused by the optical means 15, which is configured as a zoom lens 17 and is arranged displaceably along the propagation direction of the light beam, onto a microstructured optical element 19. The microstructured optical element 19 consists of an optical fibre 23 having a taper 21. In the microstructured optical element, the light from the laser is spectrally broadened. All the components are located in a casing 25 having a light exit opening 27, through which the illumination light beam 29 leaves the casing 25 as a divergent beam. The spectrum of the spectrally broadened light 31 extends from approximately 300 nm to 1600 nm, the light power being substantially constant over the entire spectrum. The spectrally broadened light 31 emerging from the optical fibre 23 is shaped with the aid of the lens 33 to form the collimated illumination light beam 29. Using the beam splitter 35, a subsidiary light beam 37 of the illumination light beam 29 is split off and diverted onto an analysis instrument 39. The latter contains a prism 41 which spectrally spreads the subsidiary light beam 37 in a spatial fashion to form a light cone 43 that diverges in the spreading plane, and a photodiode linear array 45 for detecting the light. The photodiode linear array 45 generates electrical signals, which are proportional to the power of the light of the spectral range in question and are fed to a processing unit 47. The latter is connected to a PC 49, on whose monitor 51 the spectral composition is displayed in the form of a graph 53 within a coordinate system having two axes 55, 57. The wavelength is plotted against the axis 55 and the power of the light is plotted against the axis 57. Clicking the graph 53 using a computer mouse 59 and moving the computer mouse 59 at the same time generates a dotted graph 61, which can be deformed in accordance with the movement of the computer mouse 59. As soon as the computer mouse 59 is clicked again, the computer 49 drives an instrument for varying the power 63 in such a way as to produce the spectral composition preselected by the dotted graph 61. The instrument for varying the power 63 of the spectrally broadened light 31 is designed as an AOTF 65 (acousto-optical tunable filter), and is configured in such a way that the wavelengths are influenced independently of one another, so that the spectral composition of the spectrally broadened light 31 can be adjusted. A system for controlling the output power of the laser 9 by means of the computer is furthermore provided. The user makes adjustments with the aid of the computer mouse 59. A slider 67, which is used for adjusting the overall power of the spectrally modified light 31, is represented on the monitor 51.

Figure 3:
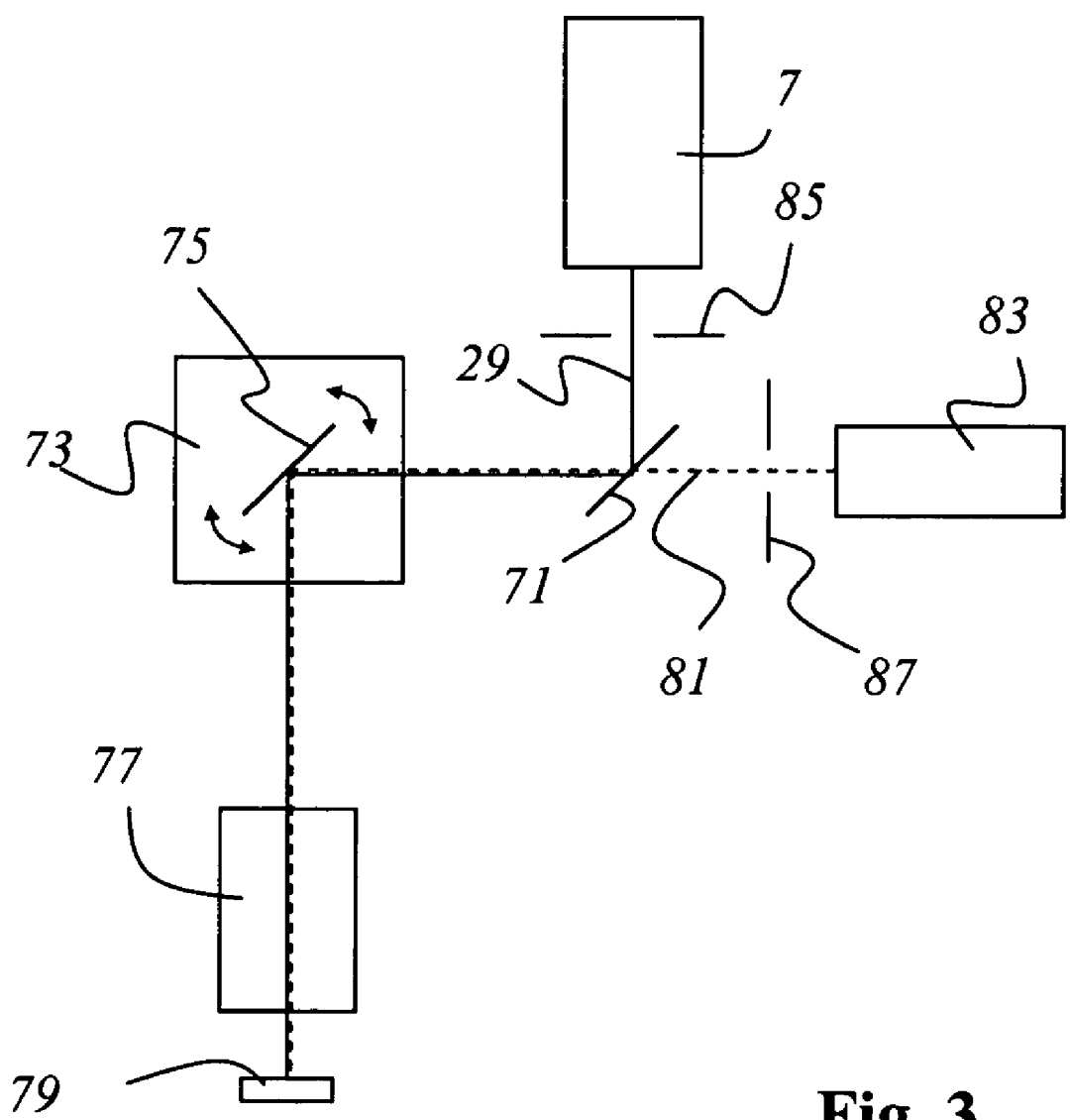
FIG. 3 shows, as an example, the use of an instrument according to the invention in a confocal scanning microscope.

FIG. 3 represents, as an example, the use of an instrument according to the invention in a confocal scanning microscope 69. The illumination light beam 29 coming from the illuminating instrument 7 is reflected by a beam splitter 71 to the scanning module 73, which contains a cardan-suspended scanning mirror 75 that guides the light beam 29 through the microscope lens 77 and over or through the object 79. In the case of non-transparent objects 79, the illumination light beam 29 is guided over the object surface. In the case of biological objects 79 or transparent objects 79, the illumination light beam 29 can also be guided through the object 79. This means that various focal planes of the object 79 are illuminated successively by the illumination light beam 29, and are hence scanned. Subsequent combination then gives a three-dimensional image of the object 79. The light beam 29 coming from the illuminating instrument 7 is represented in the figure as a solid line. The light 81 leaving the object 79 travels through the microscope lens 77 and, via the scanning module 73, to the beam splitter 71, then it passes through the latter and strikes the detector 83, which is embodied as a photomultiplier. The light 81 leaving the object 79 is represented as a dashed line. In the detector 83, electrical detection signals proportional to the power of the light 81 leaving the object 79 are generated and processed. The illumination pinhole 85 and the detection pinhole 87, which are normally provided in a confocal scanning microscope, are indicated schematically for the sake of completeness. For better clarity, however, a few optical elements for guiding and shaping the light beams are omitted. These are adequately known to a person skilled in this field.

Figure 4:
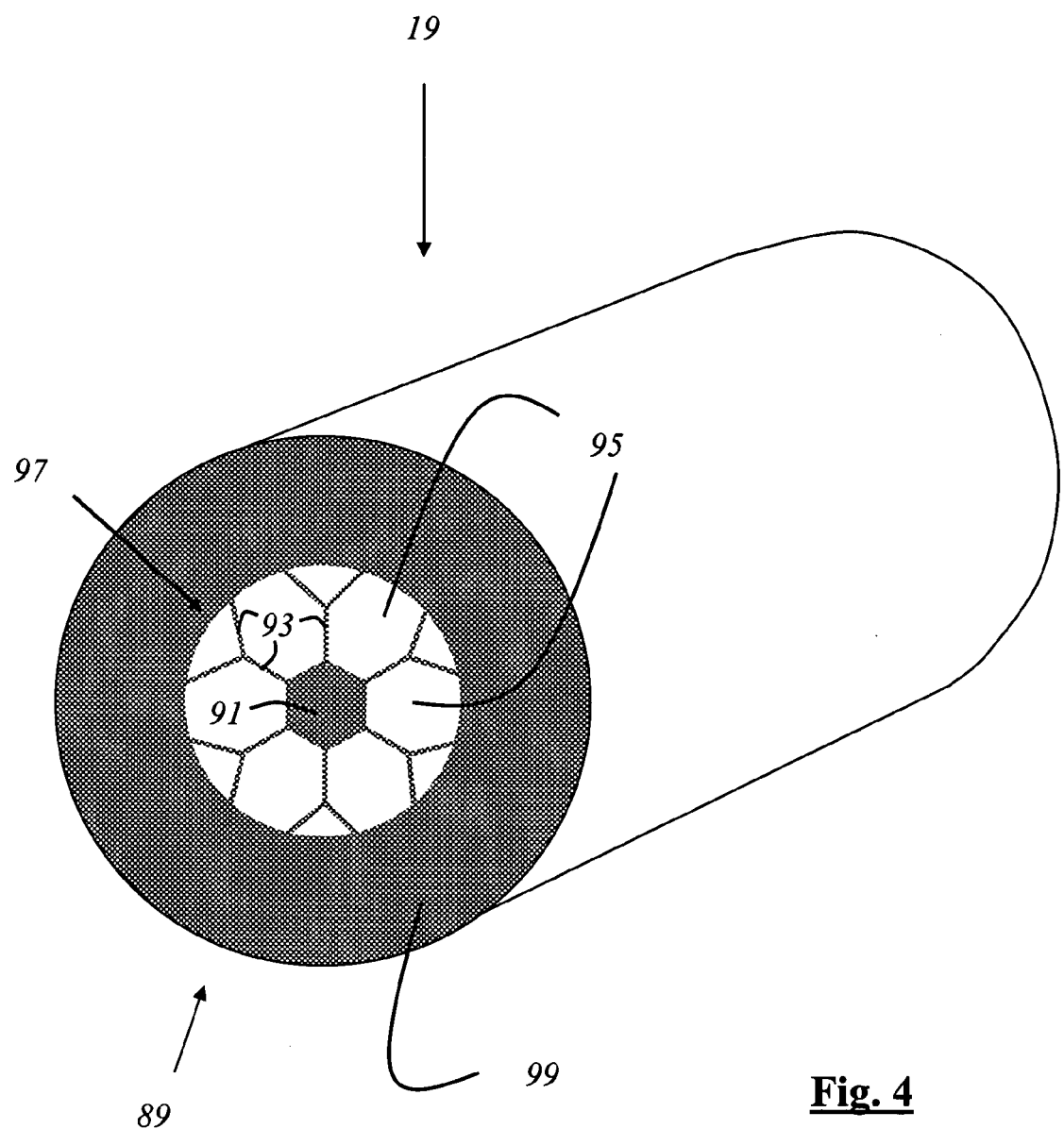
FIG. 4 shows an embodiment of the microstructured optical element.

FIG. 4 shows an embodiment of the microstructured optical element 19. It consists of photonic band gap material, which has a special honeycombed microstructure 89. The honeycombed structure that is shown is particularly suitable for generating broadband light. The diameter of the glass inner cannula 91 is approximately 1.9 μm. The inner cannula 91 is surrounded by glass webs 93. The glass webs 93 form honeycombed cavities 95. These micro-optical structure elements together form a second region 97, which is enclosed by a first region 99 that is designed as a glass cladding.

Figure 5:
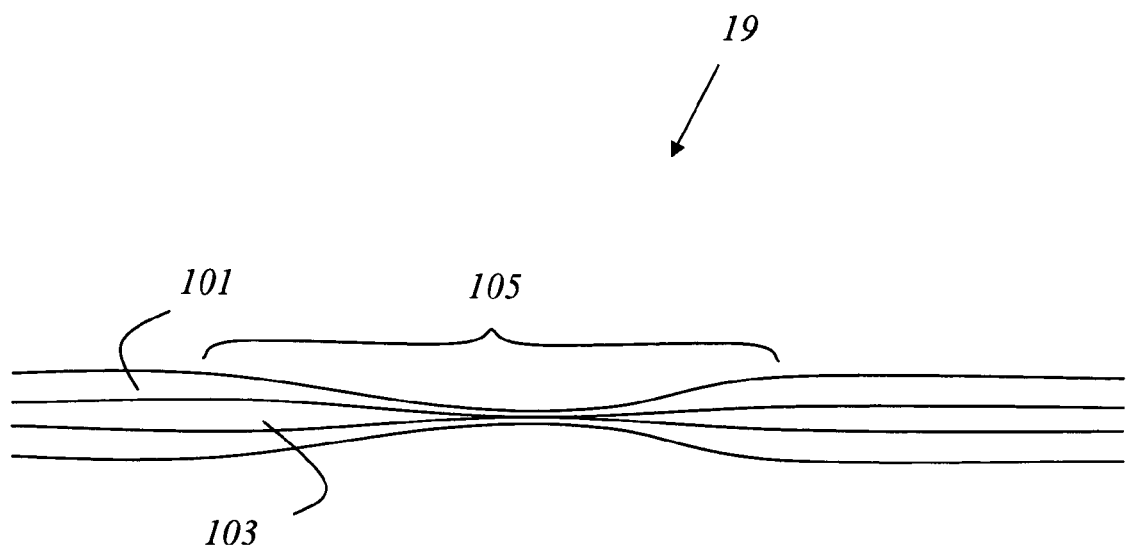
FIG. 5 shows another embodiment of the microstructured optical element.

FIG. 5 schematically shows an embodiment of the microstructured optical element 19. In this embodiment, the microstructured optical element 19 consists of conventional optical fibre 101 having an external diameter of 125 μm and a fibre core 103, which has a diameter of 6 μm. In the region of a 300 mm long taper 105, the external diameter of the optical fibre 101 is reduced to 1.8 μm. In this region, the diameter of the fibre core 103 is then only fractions of a micrometer.

The invention has been described with reference to a particular embodiment. It is, however, obvious that modifications and amendments may be made without thereby departing from the scope of protection of the following claims.

What is claimed is:

1. A microscope comprising:
   a light source configured to emit an illuminating light beam for illumination of a specimen;
   a beam splitter configured to separate measuring light out of the illuminating light beam; and
   a power detection apparatus configured to determine a light power level of the illuminating light beam, the power detection apparatus being configured to receive the measuring light and including a light detection apparatus configured for simultaneous color-selective detection of the measuring light.

2. The microscope as defined in claim 1 wherein the apparatus for simultaneous color-selective detection includes a spatial spectral spreading element.

3. The microscope as defined in claim 2 wherein the spatial spectral spreading element is a prism.

4. The microscope as defined in claim 1 wherein the apparatus for simultaneous color-selective detection comprises at least one detector configured to receive the measuring light.

5. The microscope as defined in claim 4 wherein the at least one detector includes a plurality of individual detectors configured to each receive spectrally different components of the measuring light.

6. The microscope as defined in claim 4 wherein the at least one detector includes at least one of a photodiode, a photomultiplier, a photodiode row, a photodiode array, a CCD element, a photomultiplier array and a photomultiplier row.

7. An apparatus for determining a light power level of an illuminating light beam, the apparatus comprising:
   a beam splitter configured to separate measuring light out of the illuminating light beam; and
   a detection device configured for simultaneous color-selective detection of the measuring light.

8. The apparatus as defined in claim 7 wherein the device for simultaneous color-selective detection includes a spatial spectral spreading element.

9. The apparatus as defined in claim 8 wherein the spatial spectral spreading element is a prism.

10. The apparatus as defined in claim 7 wherein the device for simultaneous color-selective detection includes at least one detector configured to receive the measuring light.

11. The apparatus as defined in claim 10 wherein the at least one detector includes a plurality of individual detectors that each receive spectrally different components of the measuring light.

12. The apparatus as defined in claim 10 wherein the at least one detector includes at least one of a photodiode, a photomultiplier, a photodiode row, a photodiode array, a CCD element, a photomultiplier array and a photomultiplier row.

13. A method for determining a light power level of an illuminating light beam, the method comprising:
   emitting, using a light source, an illuminating light beam for illumination of a specimen;
   separating measuring light out of the illuminating light beam using a beam splitter; and
   simultaneously and color-selectively detecting the measuring light using a light detection apparatus.

14. The method as defined in claim 13 further comprising generating electrical signals each proportional to a respective power level of respective spectral components of the measured light.

15. The method as defined in claim 13 wherein the light detection apparatus includes a spatial spectral spreading element.

16. The method as defined in claim 15 wherein the spatial spectral spreading element is a prism.

17. The method as defined in claim 13 wherein the light detection apparatus includes a at least one detector configured to receive the measuring light.

18. The method as defined in claim 17 wherein the at least one detector includes a plurality of individual detectors configured to each receive spectrally different components of the measuring light.

19. The method as defined in claim 17 wherein the at least one detector includes at least one of a photodiode, a photomultiplier, a photodiode row, a photodiode array, a CCD element, a photomultiplier array and a photomultiplier row.

* * * * *